3,562,128
APPARATUS FOR GAS CONVERSION AND FOR MEASURING AMMONIA AND SULFUR DIOXIDE CONTAMINANTS IN A GAS

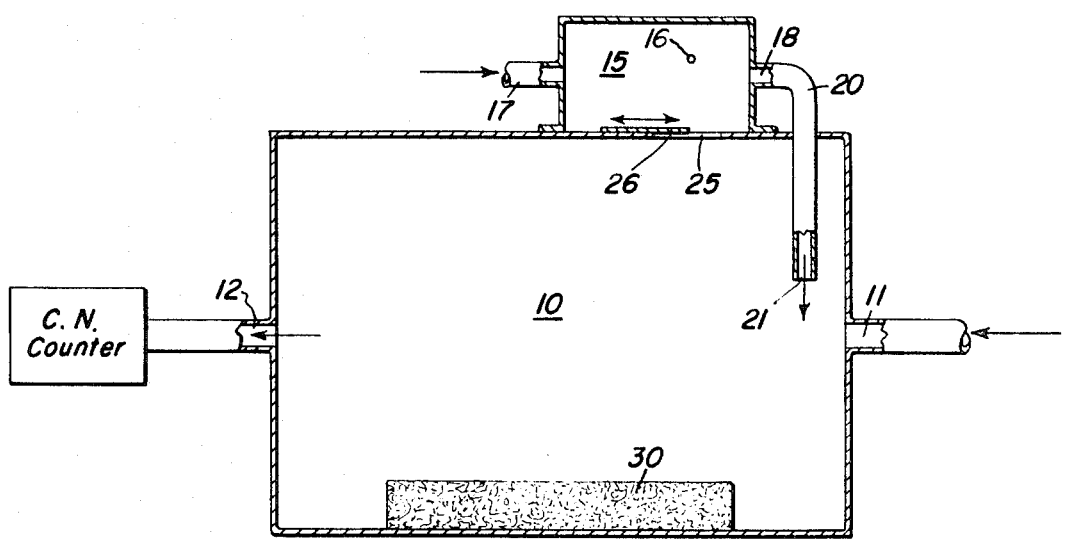

Peter E. Coffey, Ballston Spa, N.Y., assignor to General Electric Company, a corporation of New York
Filed Dec. 26, 1967, Ser. No. 693,336
Int. Cl. B01k 1/00; G01h 31/00, 33/00
U.S. Cl. 204—193                                    1 Claim

ABSTRACT OF THE DISCLOSURE

A gas conversion apparatus is disclosed for use in conjunction with a condensation nuclei counter in the detection and measurement of ammonia and sulfur dioxide in a gas such as air. The apparatus includes a reaction chamber substantially filled with acid vapor, a separate corona discharge chamber, means for passing clean gas through the corona discharge chamber wherein ions are produced therein and means for injecting the ionized gas into the reaction chamber, means for passing the gas to be analyzed through the reaction chamber with the ionized gas to produce ammonium salt condensation nuclei, and means to selectively expose the gases in the reaction chamber to ultraviolet light to convert any sulfur dioxide to sulfur trioxide.

CROSS-REFERENCE

Ser. No. 516,013, filed Dec. 23, 1965, now U.S. Patent No. 3,503,711, issued Mar. 31, 1970, entitled "Improved Ammonia Detection Apparatus," George F. Skala, assigned to the assignee of the present application.

The invention described herein was made in the course of or under a contract with the Department of the Army.

BACKGROUND OF THE INVENTION

The present invention relates to the detection of the presence of ammonia and sulfur dioxide in another carrier gas such as, for example, air. As shown and set forth in greater detail in the previously referenced copending patent application, the presence of ammonia in a gas such as air may be detected and the concentration measured by exposing the gas to an acid vapor to convert the ammonia to a dispersion of very fine solid particles of an ammonia salt such as ammonium chloride and measuring the concentration by an instrument such as a condensation nuclei counter. As pointed out in the copending application, the sensitivity of the converter may be greatly increased by exposing the gas to a corona discharge before the gas is treated by the acid vapor. If, however, the gas also contains sulfur dioxide, the ultraviolet light produced by the corona discharge converts the sulfur dioxide to sulfur trioxide which will combine with water vapor to form droplets of sulfuric acid which are detectable as particles by the condensation nuclei counter and give a spurious reading. It would therefore be desirable to provide a gas conversion apparatus for detecting and measuring the ammonia concentration in another gas such as air which would be insensitive to sulfur dioxide in one mode of operation and in another mode of operation, detect and measure both the ammonia and sulfur dioxide concentrations so that the sulfur dioxide concentration could be determined by difference.

It is therefore a principal object of this invention to provide such an apparatus. Other and specifically different objects of the invention will become apparent to those skilled in the art from the detailed description which follows, taken in conjunction with the accompanying drawing which schematically illustrates one embodiment of the invention.

More specifically, and with reference to the drawing, a reaction chamber 10 is provided with an inlet 11 and an outlet 12. A corona chamber 15 is located adjacent to chamber 10 and contains a corona generating source 16 as shown. Chamber 15 is provided with an inlet 17 and an outlet 18 which is connected to an injection duct 20 having an outlet 21 within the chamber 10 adjacent to inlet 11. An opening 25 between chambers 10 and 15 is provided with a closure 26 which is operable to selectively open or close opening 25. In the drawing, closure 26 is shown as a slidable member in an intermediate position and located within chamber 15. It will be obvious that the closure may be equally well pivoted and located either within chamber 10 or a sliding member located between adjacent closely spaced walls of the chambers. The important requirement is that when closure 26 is in the closed position, no ultraviolet light can pass from corona chamber 15 into reaction chamber 10, and when the closure is in the open position, ultraviolet light from corona source 16 is free to pass into the reaction chamber. A source of acid vapor 30 is provided in chamber 10 and may consist of a wick-like body saturated with an acid solution, for example, about 20 percent aqueous solution of hydrochloric acid.

In one contemplated mode of operation, closure 26 is moved to its fully open position with respect to opening 25. A sample of a gas to be examined is passed into the reaction chamber 10 through inlet 11, the reaction chamber 10 being substantially filled with acid vapor. The corona discharge source 16 is activated and a stream of clean, filtered gas uncontaminated with sulfur dioxide and ammonia is passed through inlet 17, through chamber 15 and into chamber 10 through opening 25 and injection conduit 20 and outlet 21. Ammonia gas in the gas stream entering the chamber 10 through inlet 11 reacts with the acid vapor in the reaction chamber at an accelerated rate because of the generation of ions by the corona source to form condensation nuclei of ammonium salt particles. Any sulfur dioxide contained in the gas will be simultaneously converted to sulfur trioxide and the gas containing the ammonium salt nuclei and the sulfur trioxide is passed through outlet 12 and carried to a condensation nuclei counter through appropriate conduit means, not shown, where the total condensation nuclei consisting of ammonium salt particles and sulfuric acid droplets are counted. The closure is then moved to the closed position, preventing ultraviolet radiation from entering chamber 10 from chamber 15 and the process repeated with another sample of the gas substantially identical to the first sample. Under these conditions, any sulfur dioxide present is not changed to sulfur trioxide and only the ammonia is converted to condensation nuclei, which are counted by the condensation nuclei counter. If sulfur dioxide is present in gas in addition to ammonia, the two counting results will be different, with the difference between the results of the two measurements reflecting the concentration of sulfur dioxide in the carrying gas. Obviously, the order of the two measurements may be reversed and, if desired, a separate source of ultraviolet light may be provided in the reaction chamber and the movable closure member and opening omitted. While for purposes of setting forth an enabling disclosure, certain specific examples of structures have been disclosed and illustrated, numerous variations within the scope of the invention will readily occur to those skilled in the art. It is therefore not intended to limit the invention in any manner except as set forth in the appended claims.

What I claim as new and desire to secure by Letters Patent of the United States is:

1. Gas conversion apparatus comprising a reaction chamber having inlet and outlet means, means for providing acid vapor to the interior of said reaction chamber, means for passing a gas through said reaction chamber via said inlet and outlet means, a corona discharge chamber having inlet and outlet means, means for producing a corona discharge within said discharge chamber, means for passing an uncontaminated ionizable gas through said discharge chamber, means for injecting gas from said discharge chamber into said reaction chamber, and means for selectively exposing the interior of said reaction chamber to ultraviolet radiation comprising an opening interconnecting the interiors of said discharge and reaction chambers and a movable closure for said opening which is opaque to ultraviolet radiation.

References Cited

UNITED STATES PATENTS

| 2,468,175 | 4/1949 | Cotton | 204—312 |
|---|---|---|---|
| 2,897,059 | 7/1959 | Van Luik, Jr. | 23—232E |
| 3,152,056 | 10/1964 | Berghaus et al. | 204—177 |
| 3,198,721 | 8/1965 | Rich | 23—232X |

OTHER REFERENCES

Van Luik, Jr. et al.: Analytical Chemistry, vol. 34, pp. 1617–1620 (November 1962).

JOSEPH SCOVRONEK, Primary Examiner

U.S. Cl. X.R.

23—232, 252, 254; 204—156, 164, 312